US008634434B2

(12) United States Patent
Heidari et al.

(10) Patent No.: US 8,634,434 B2
(45) Date of Patent: Jan. 21, 2014

(54) MESSAGE ROUTING IN WIRELESS MESH NETWORKS

(75) Inventors: Sam Heidari, Los Altos Hills, CA (US); Sigurd Schelstraete, Menlo Park, CA (US); Ravi Narasimhan, Los Altos, CA (US); Andrea Goldsmith, Menlo Park, CA (US)

(73) Assignee: Quantenna Communications, Inc., Fremont, CA (US)

( * ) Notice: Subject to any disclaimer, the term of this patent is extended or adjusted under 35 U.S.C. 154(b) by 364 days.

(21) Appl. No.: 12/939,023

(22) Filed: Nov. 3, 2010

(65) Prior Publication Data

US 2011/0110345 A1      May 12, 2011

Related U.S. Application Data

(60) Provisional application No. 61/259,002, filed on Nov. 6, 2009.

(51) Int. Cl.
*H04L 12/43*      (2006.01)

(52) U.S. Cl.
USPC .................................................... 370/458

(58) Field of Classification Search
None
See application file for complete search history.

(56) References Cited

U.S. PATENT DOCUMENTS

| 7,983,302 B2* | 7/2011 | Doppler et al. ............... 370/473 |
| 2010/0103858 A1* | 4/2010 | Palanki et al. ............... 370/315 |
| 2011/0026427 A1* | 2/2011 | Wang et al. .................. 370/252 |

* cited by examiner

*Primary Examiner* — Raj Jain

(57) ABSTRACT

Disclosed are methods and apparatuses related to the routing of communications in a wireless mesh network so as to provide improved range, reliability and/or throughput. At least some aspects of the techniques and apparatuses can be implemented in an intermediary node (relay node) on a wireless mesh network. The relay node and other devices on the wireless network may implement a form of multiple-input multiple-output (MIMO) communication, such as multi-user MIMO (MU-MIMO). The devices on the network can communicate in accordance with IEEE standard 802.11.

2 Claims, 14 Drawing Sheets

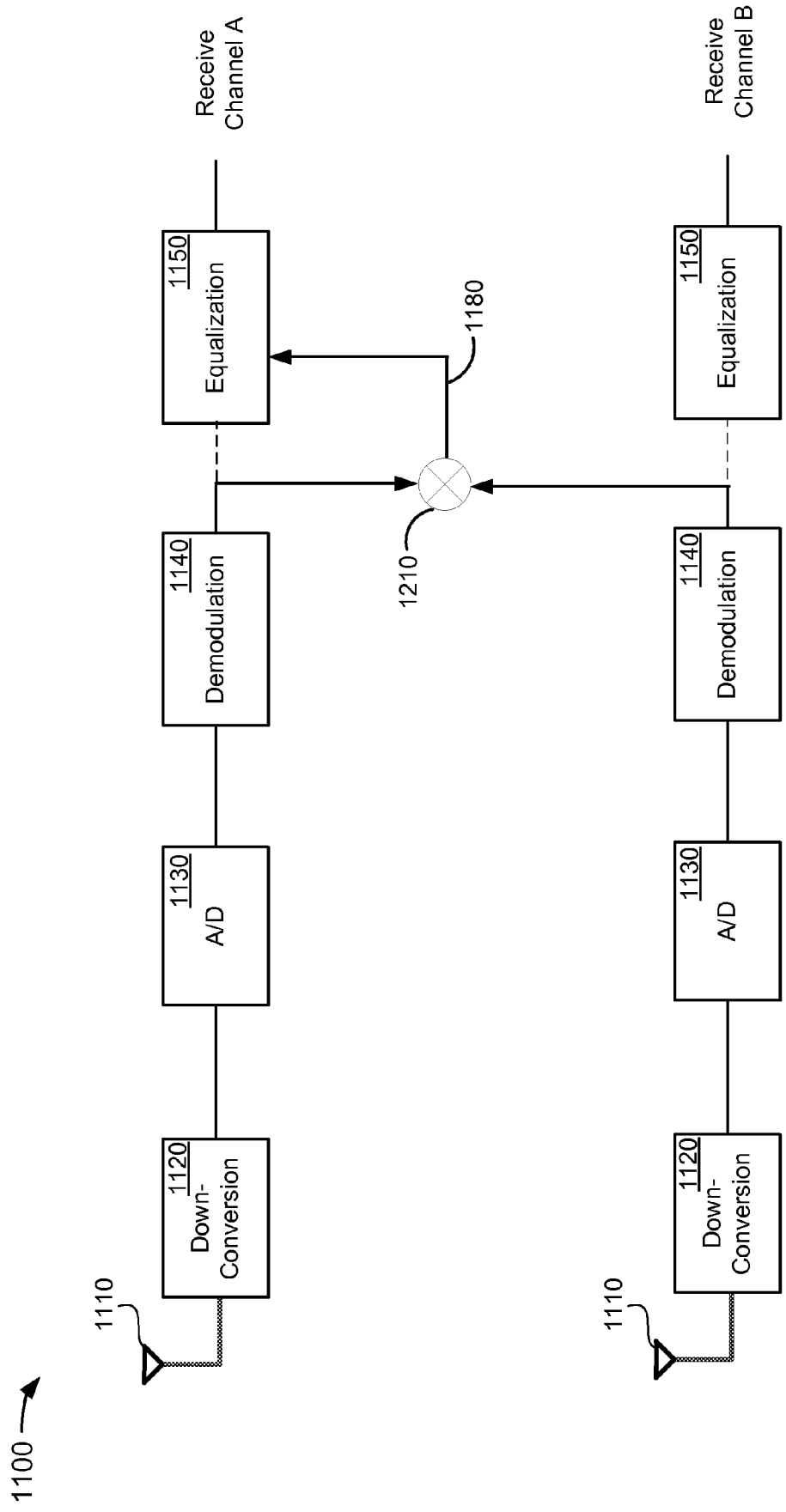

MESSAGE ROUTING IN WIRELESS MESH NETWORKS

This application claims the benefit of U.S. Provisional Patent Application No. 61/259,002, filed on Nov. 6, 2009, which is incorporated herein by reference.

FIELD OF THE INVENTION

At least one embodiment of the present invention pertains to wireless networks, and more particularly, to a technique and apparatus for routing communications in a wireless mesh network.

BACKGROUND

Wireless communication networks have gained widespread use in recent years. Among the commonly used forms of wireless networks are those that implement versions of Institute of Electrical and Electronics Engineers (IEEE) standard 802.11 (e.g., 802.11a, 802.11b, 802.11g, 802.11n), WI-FI, GSM, and Bluetooth. Among the design issues associated with such networks are range and reliability. In particular, there is a push in the industry to continually improve both the range and reliability of such networks. A related characteristic is throughput, which tends to have an inverse relationship to range and reliability.

One way to improve the range of a wireless network is to increase the transmission power of one or more nodes on the network. However, at least in the case of many wireless networks, regulations limit the amount of power that a node can use to transmit. Accordingly, another technique that has been used to improve the range of wireless networks is mesh networking.

A mesh network is a network in which each node on the network acts as an independent router. Intermediate nodes are used as relays for multi-hop routing. Additionally, mesh networking improves the reliability of a network, because a mesh network can dynamically adjust the routes between nodes to circumvent broken, blocked, or poorly-performing links along the path between a source node and a destination node. As a result, mesh networks are self-healing, in that they can still operate even when a node breaks down or a connection fails.

Despite the above advances, there remains substantial room for improvement in range, reliability and throughput of wireless networks, particularly wireless mesh networks.

SUMMARY

The techniques introduced here include methods and apparatuses related to the routing of communications in a wireless mesh network so as to provide improved range, reliability and/or throughput. At least some aspects of the techniques and apparatuses introduced here can be implemented in an intermediary node (relay node) on a wireless mesh network. In all of these techniques, the relay node and other devices on the wireless network may implement a form of multiple-input multiple-output (MIMO) communication, such as multi-user MIMO (MU-MIMO). Also, in all of these techniques the devices on the network perform communications in accordance with one or more versions of IEEE standard 802.11 (hereinafter referred to individually and collectively as "802.11"), for example.

In one aspect, the techniques introduced here include using frequency division multiplexing (FDM) at an intermediary node in a wireless mesh network, to communicate with at least one other node in the wireless mesh network. This may involve, for example, transmitting signals from the intermediary node to at least one other node concurrently at a plurality of different frequencies; or receiving, by the intermediary node, a plurality of signals concurrently from at least one other node, wherein each of the plurality of signals is at a different frequency. This could also involve receiving, by the intermediary node, a first signal at a first frequency from a first node on the wireless mesh network, and sending a second signal from the intermediary node to a second node on the wireless mesh network, concurrently with receiving the first signal at the intermediary node. The FDM may be done in combination with time division multiplexing (TDM) at the intermediary node.

Hence, in another aspect, the techniques introduced here include the ability to implement both TDM and FDM concurrently in an intermediary node on a wireless mesh network. Accordingly, these techniques include a method that includes receiving, at an intermediary node on a wireless mesh network, a first transmission of information at a particular (first) frequency over the mesh network during a first timeslot of a time interval; and then forwarding the received information to another node on the wireless mesh network, by sending from the intermediary node a second transmission of the information at a different (second) frequency during a second timeslot of the time interval. The ability to use different frequencies simultaneously in the same network can translate into greater robustness or increased throughput. Prior to the second transmission, the intermediary node may have dynamically selected the second frequency to use for the second transmission, based on a real-time measurement one or more parameters on the wireless mesh network.

In another aspect, an intermediary node on a wireless mesh network includes dual circuitry to allow it to operate concurrently as both an access point (AP) and as a non-AP node (hereinafter a "station node" or simply "station"). Accordingly, the intermediary node can comprise a first communication unit and a second communication unit, where the first communication unit operates in a station mode to receive a wireless transmission of information from an AP on the mesh network; and the second communication unit is coupled to the first communication unit and operates in an access point mode to forward the received information, from the mesh node to a station on the mesh network other than the AP. In certain embodiments, the first communication unit and the second communication unit are implemented as, or in, separate chipsets. In certain embodiments, the first communication unit receives the transmission at a first frequency in a given frequency band, and the second communication unit generates a retransmission of the information at a different frequency, which may be in the same frequency band. The second frequency can be selected dynamically based on a real-time measurement of one or more parameters on the wireless mesh network. The first communication unit may receive the information from the access point during a first timeslot of a time interval and the second communication unit may then forward the information to the station during a second timeslot of the time interval.

Another aspect of the techniques introduced here is a technique for "reusing" frequencies within a mesh network. For example, if an intermediary node on a wireless mesh network detects that the maximum signal level of all signals it is receiving (if any) on a selected frequency is below a specified threshold, it may then use that frequency to forward a received message to another node, even though that frequency may actually be in use somewhere else in the same wireless mesh network. In effect, the intermediary node determined that it is far enough away from, and/or sufficiently out of the radiation pattern of, whichever other node(s) is/are using that frequency, so that there will not be any significant interference with its forwarding transmission.

In still another aspect, the techniques introduced here include increasing reliability by coherently combining, in a destination node on the wireless mesh network, a transmission from an intermediary on a wireless mesh network with a transmission from a source node. For example, a method according to this aspect can comprise receiving at the intermediary node a first transmission containing a message intended for the destination node, and then determining, in the intermediary node, whether the destination node successfully received the first transmission. This determination can be made, for example, by listening for an acknowledgement from the destination node and determining that the destination node did not successfully receive the first transmission if an acknowledgment from the destination node is not detected within a specified time interval. The method may further include, in response to determining that the destination node did not successfully receive the first transmission, sending from the intermediary node a second transmission containing the message, where the second transmission is synchronized with a (expected) retransmission of the message from the source node.

Alternatively, the transmission from the intermediary node to the destination node can be synchronized with the original transmission from the source node, rather than a retransmission (subject to a small but tolerable delay).

The transmissions from the source node and the intermediary node can be at the same frequency or at different frequencies. The frequency of the transmission from the relay node can be selected dynamically at random or based on a real-time measurement of one or more parameters on the wireless mesh network.

The techniques introduced above can be implemented in a multi-hop MIMO mesh network that utilizes space, frequency, and/or time in its routing protocol. In such a network, any device can operate as an AP or a non-AP station, or both. An AP can be the centralized controller for routing, resource allocation, frequency selection, and time-division optimization. Devices can transmit directly to their destinations or via relay nodes or the AP.

Other aspects will be apparent from the accompanying figures and detailed description. The above summary is provided to introduce in a simplified form certain concepts that are further described in the Detailed Description below. It is not intended to identify essential features of the claimed subject matter or to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

FIGS. 11A through 11C show different configurations in a destination node by which received signals can be coherently combined.

DETAILED DESCRIPTION

Figure 1:
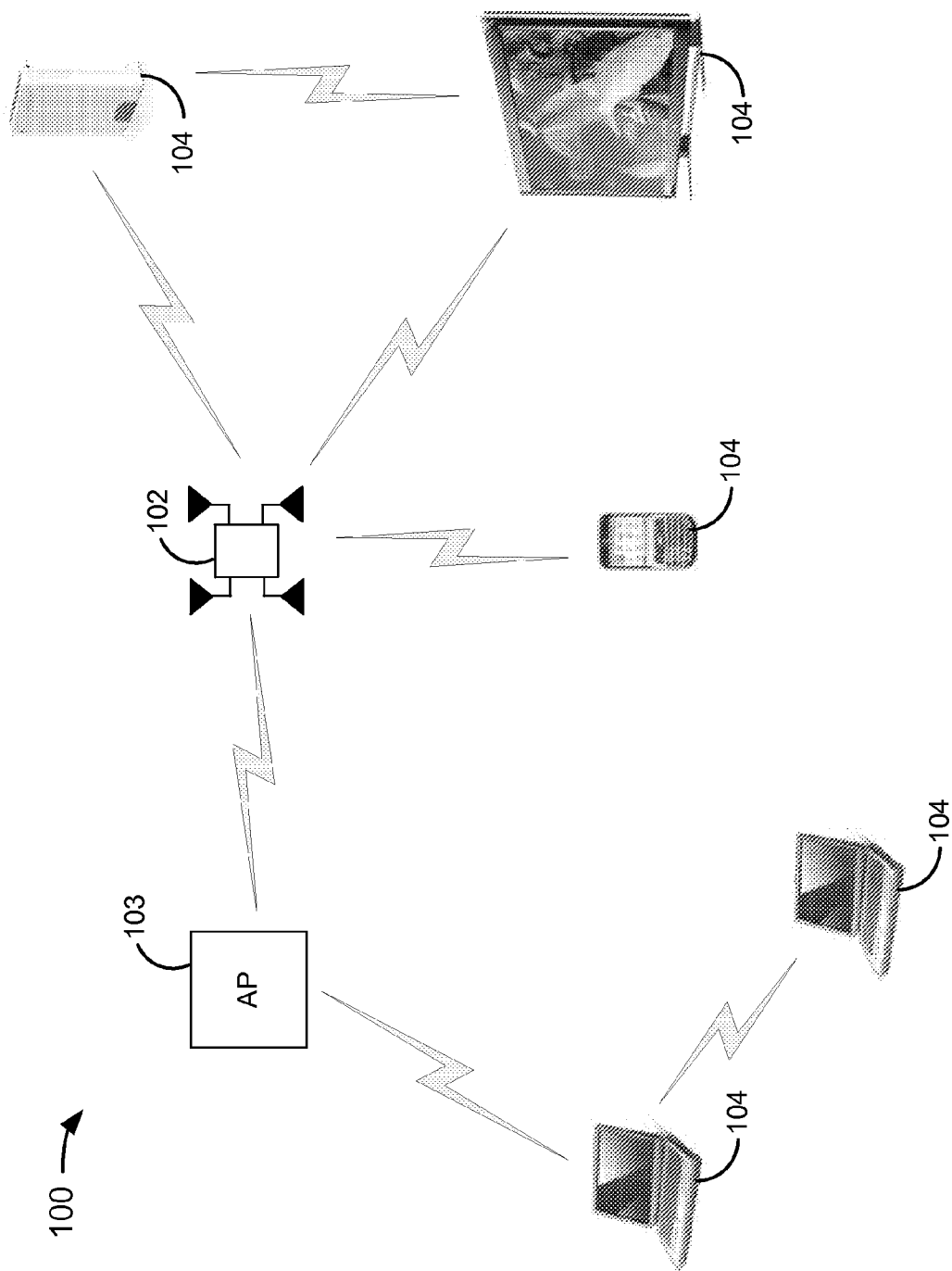
FIG. 1 illustrates an example of a wireless mesh network which includes a relay node.

FIG. 1 shows an example of a wireless mesh network 100. The network 100 includes a number of nodes, including a relay node 102, an AP 103 and clients 104, which are all wirelessly connected to one another either directly or indirectly through one or more intermediary nodes, such as relay node 102 and/or AP 103. The connections depicted in FIG. 1 are arbitrary and are intended to be used for illustrative purposes only. Each of the clients 104 is coupled to the rest of the mesh network 100 through relay node 102 and/or AP 103. Various types of clients 104 are depicted in the example of FIG. 1 for illustrative purposes, and are not intended to be limiting.

In another embodiment, one or more of the clients 104 could serve as a relay node or as an AP. However, for illustrative purposes, a distinction is drawn between clients (as source-destination pairs of the network) and relay nodes within the network. Accordingly, these alternatives are subsumed when appropriately characterized by location within a network and function.

In general, at least one node in a wireless mesh network has multiple antennas. Accordingly, it is assumed herein that relay node 102 has multiple antennas, or at least an antenna with multi-antenna functionality. A system can take advantage of mesh element network characteristics in network architecture and/or protocols. In this way, the system can adapt to traffic and/or network demands by optimizing end-to-end transmissions from a client 104, through a relay node 102, to another client 104.

Although it is not illustrated as such, the network 100 can include multiple wirelessly-connected relays 102 and/or multiple wirelessly-connected APs 103. Advantageously, the mesh network 100 can exploit the multiple antennas in an associated mesh network architecture and protocol stack. This enables routing over multiple degrees of freedom including, for example, space, frequency and time. This may enable, for example, multi-antenna routing, multi-frequency routing, time-division routing, etc. The multiple antennas can be used to make channels more robust, or the antennas can be used to establish multiple spatial channels.

Figure 2:
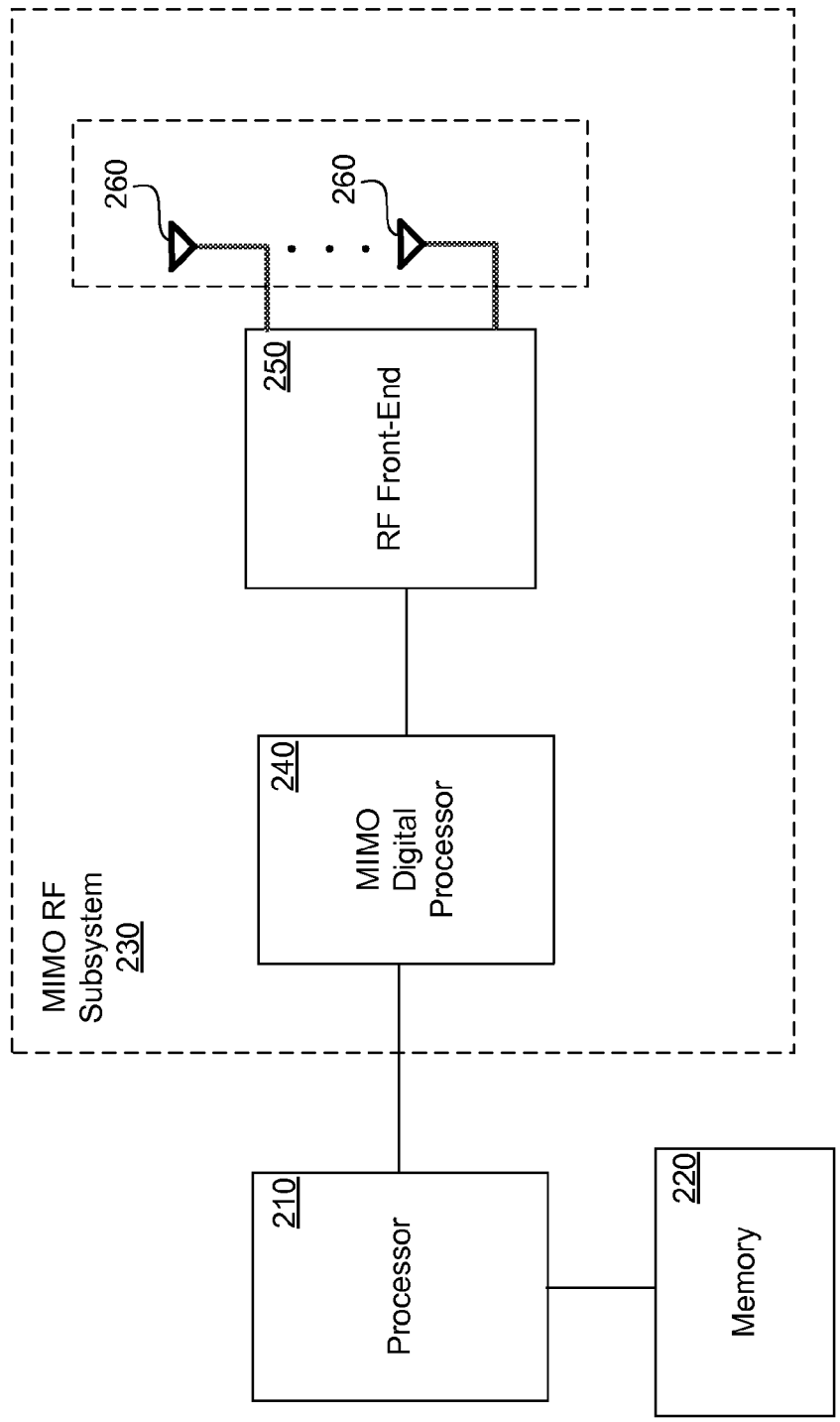
FIG. 2 is a simplified block diagram of a node on the wireless mesh network.

FIG. 2 is a simplified block diagram of a node on the wireless mesh network 100. Node 200 can be, for example, a relay node 102, an AP 103 or a client 104, of FIG. 1. As shown, the node 200 includes a processor 210, a memory 220 coupled to the processor 210, and a MIMO radio frequency (RF) subsystem 230 coupled to the processor 210. The RF subsystem 230 in the illustrated embodiment includes a MIMO digital processor 240 and an RF front-end 250, coupled to each other. The RF front-end 250 includes one or more radio chains (not shown). Each radio chain includes an RF transmitter and/or receiver and supporting components for RF transmission and/or reception. The RF front-end 250 can have known or convenient capabilities and/or settings. The antennas 260, which are coupled to the RF front-end 250, can also have known or convenient capabilities and/or settings.

The MIMO digital processor 240 controls and coordinates transmission and reception activities of the MIMO RF subsystem 230 according to known or convenient MIMO RF techniques. These may include basic MIMO, multi-user MIMO (MU-MIMO), cooperative MIMO (CO-MIMO), MIMO routing, OFDM-MIMO, or other MIMO technologies.

The MIMO RF subsystem 230 also includes multiple antennas 260. These may include some number, M, of transmit antennas and some number, N, of receive antennas, for M×N MIMO operation. The node 200 may also include other components which are not germane to this disclosure. For example, if the node 200 is a client, it may also include input/output (I/O) devices, such as a display device, keypad, microphone, speaker, etc.

The processor 210 may be or include the central processing unit(s) (CPU(s)) of the node 200 and, thus, control the overall operation of the node 200. In certain embodiments, the processor 210 can accomplish this by executing software and/or firmware (code and data) stored in memory, such as memory 220.

The processor 210 may be, or may include, one or more programmable general-purpose or special-purpose microprocessors, digital signal processors (DSPs), programmable controllers, application specific integrated circuits (ASICs), programmable logic devices (PLDs), and/or any other known or convenient form of information processing device, or a combination of such devices.

Memory 220 is or includes the main memory (working memory) of the node 200. Memory 220 represents any form of random access memory (RAM), read-only memory (ROM), flash memory, and/or any other known or convenient form of information storage device, or a combination of such devices. In use, memory 220 may contain, among other things, software and/or firmware code and data to cause operations such as described herein to be performed. This can include code for implementing some or all of the mesh routing techniques introduced here. In other embodiments, the techniques may be implemented wholly or partially in special-purpose ("hardwired") circuitry.

Figure 3:
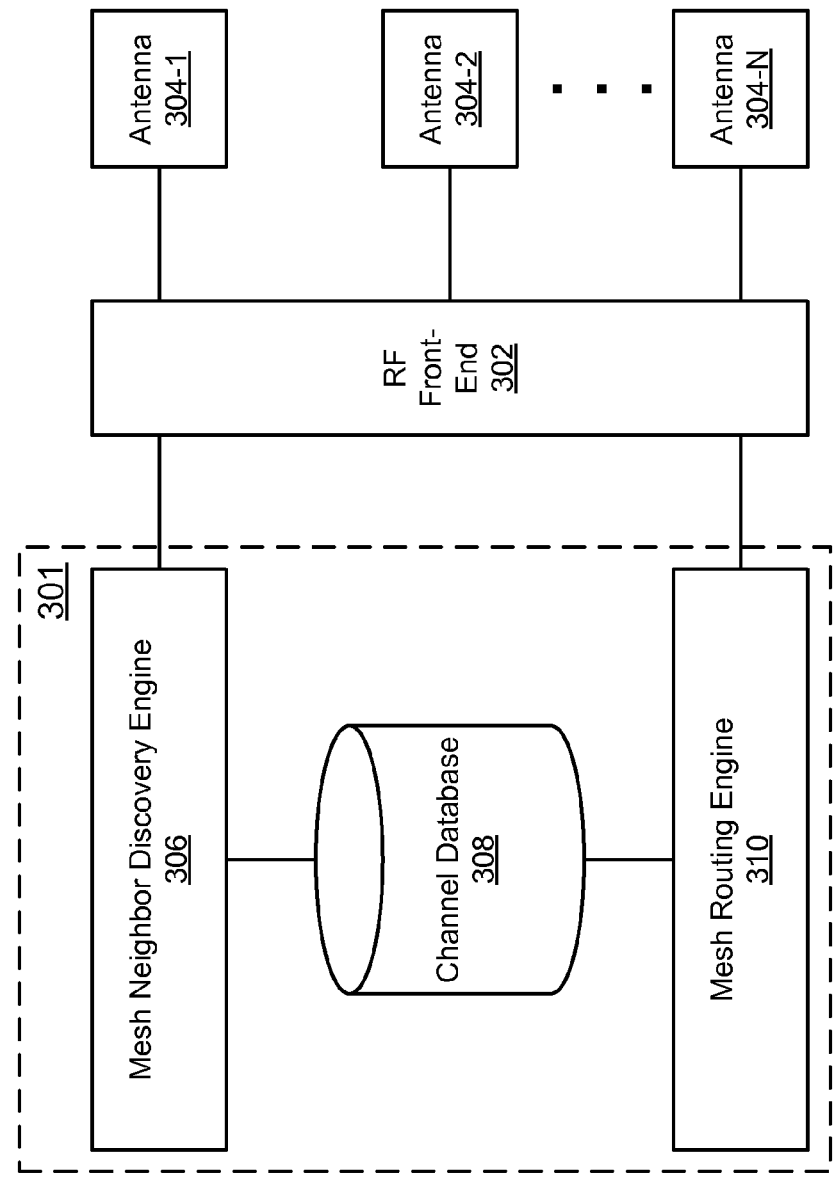
FIG. 3 shows certain elements of a wireless mesh relay node, according to one embodiment.

FIG. 3 shows elements of a wireless mesh relay node, according to one embodiment. The relay node 300 in the illustrated embodiment includes an RF front-end 302, antennas 304-1 to 304-N (referred to collectively as antennas 304), a mesh neighbor discovery engine 306, a channel database 308, and a mesh routing engine 310. The mesh neighbor discovery engine 306 is coupled to the RF front-end 302 and the channel database 308. The RF front-end 302 can have functions and characteristics the same or similar to RF front-end 250 described above. Likewise, antennas 304 can have functions and characteristics the same or similar to antennas 260 described above.

The mesh neighbor discovery engine 306 can implement a known or convenient neighbor discovery process. In a typical implementation, at least some of the data collected during the neighbor discovery process is stored in the channel database 308.

The mesh routing engine 310 is coupled to the RF front-end 302 and the channel database 308. The mesh routing engine 310 implements a mesh routing process, such as described further below. In a typical implementation, data from the channel database 308 is used to determine end-to-end routes for a client-source pair coupled to the network. Such a determination may be distributed, such that the relay node 300 knows only enough information to determine the next hop. Alternatively, more information may be stored in the relay node 300. For example, the mesh routing engine 310 could maintain a routing table that includes more information than just the next hop.

Mesh routing can exploit channel and interference information at each available frequency between relay nodes, and between client nodes and their corresponding relay nodes, to determine an optimal end-to-end route through the network as a function of a given performance metric, which may be a function of raw data rate, throughput, delay, and/or jitter. A route from one client node to another client node in the network may utilize multi-hop routing across relays, as well as multiple frequencies.

The RF front-end 302 can have functions and characteristics the same or similar to RF front-end 250 described above. Likewise, antennas 304 can have functions and characteristics the same or similar to antennas 26 described above.

In one embodiment, machine-executable instructions for implementing the mesh neighbor discovery engine 306, channel database 308, and mesh routing engine 310 are stored in a computer-readable medium in the relay node 2, such as memory 220 in FIG. 2. As used herein, an "engine" is, includes or is part of a known or convenient form of processor. The processor(s) associated with the mesh neighbor discovery engine 306 may or may not be the same as a processor that drives access to the channel database 308 and/or is included in the mesh routing engine 310. Moreover, memory and/or non-volatile storage associated with any of the components may or may not overlap.

Figure 4:
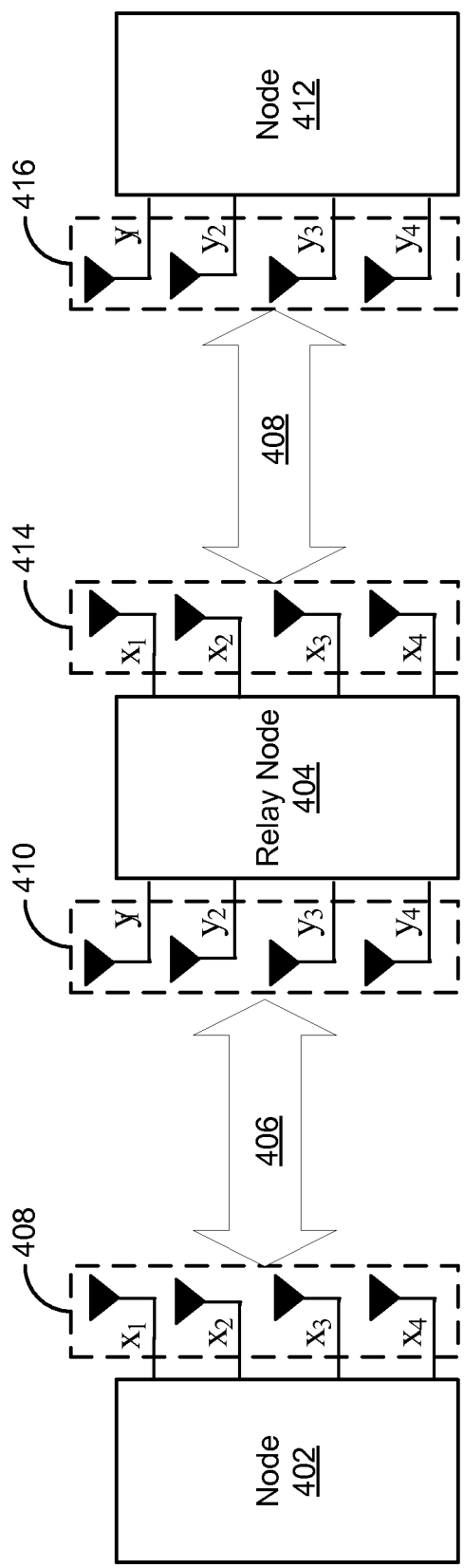
FIG. 4 illustrates an example of how a wireless mesh relay node is used.

FIG. 4 illustrates an example of how a wireless mesh relay node can be used. In the example of FIG. 4, a first node 402 11 wireless mesh network has (for illustrative purposes only) four transmit antennas $x_1$, $x_2$, $x_3$, and $x_4$ (collectively designated 408). Another node, a wireless relay node 404, has (for illustrative purposes only) four receive antennas $y_1$, $y_2$, $y_3$, and $y_4$ (collectively designated 410). The paths from antennas 408 to antennas 410 may be referred to collectively as a MIMO channel 406. Note that node 402 can also be a wireless relay node, a root node (the last node in the wireless backhaul chain).

Another MIMO channel 408, between the transmit antennas 414 of wireless relay node 404 and the receive antennas 416 of another node 412, behaves in a similar manner. The number of antennas is not necessarily the same for nodes 402 and 412. The flow of traffic is in opposite directions for upstream and downstream transmissions. In a typical deployment, there may be a difference between upstream and downstream bandwidth, where downstream bandwidth is often greater than upstream bandwidth.

In general, the multiple antennas on nodes 402, 404 and 412 can be used to increase data rates by creating multiple independent channels between the nodes (e.g., via spatial multiplexing). The maximum number of data paths that can be created is the minimum of N and M in an M×N MIMO system, where M is the number of transmit antennas and N is the number of receive antennas. Alternatively, transmitted signals can be combined via transmit diversity or beamforming, and/or the received signals can be combined via receive diversity, which increases link robustness. Also, beam steering can be done to steer an antenna beam in a given direction, which increases range and/or reduces interference. These techniques are not mutually exclusive, and some antennas can be used for spatial multiplexing, others for diversity, and still others for beamsteering or beamforming.

Figure 5:
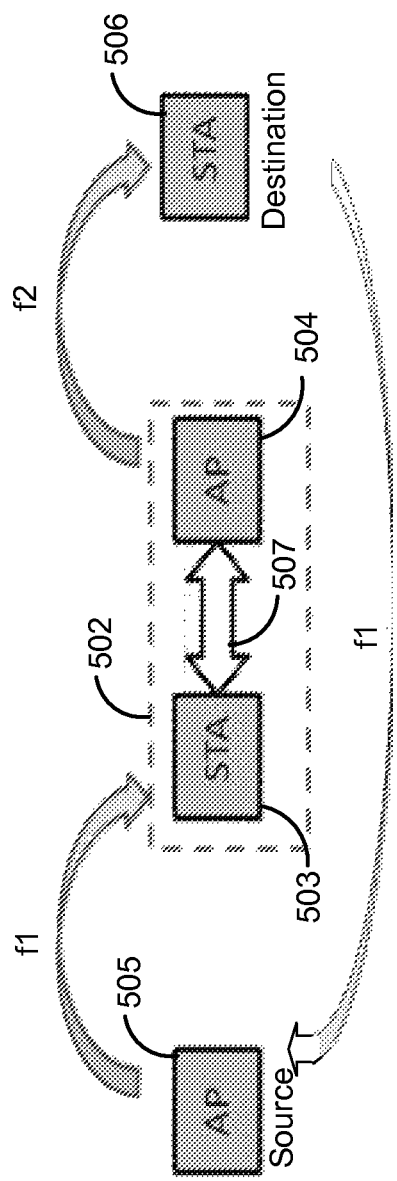
FIG. 5 shows a wireless mesh relay node that includes dual circuitry to allow it to operate concurrently as both a wireless AP and as a non-AP node.

In the techniques introduced here, a wireless relay node can include dual circuitry to allow it to operate concurrently as both a wireless AP and as a non-AP node (hereinafter a "station node" or simply a "station") in a wireless mesh network. FIG. 5 shows an example of how this may be accomplished. The relay node 502 can be generally consistent with the configurations shown in FIGS. 2 and 3. However, the relay node 502 includes two independent communication units 503 and 504. Each communication unit 503, 504 can implement a separate MIMO RF subsystem. One communication unit 503 operates in a station ("STA") mode, and the other communication unit 504 operates in an AP mode. The source node 505 (which may be an AP) associates with the station mode communication unit 503 in the relay node 502. The AP communication unit 504 of the relay node 502 associates with the destination node 506, which operates in station mode. Each of the nodes 502, 505 and 506 is assumed to include multiple transmit antenna and multiple receive antennas.

Each communication unit 503, 504 can be, for example, a chipset, each having its own one or more processors, memory, etc. An interconnect 507 couples the two communication units 503, 504 together to allow message forwarding from the station mode communication unit 503 to the AP mode communication unit 504, or vice versa. The interconnect 507 may be, for example, an ethernet-based interconnect.

Each communication unit 503, 504 may be designed or configured for operation according to IEEE standard 802.11n, for example. The system in FIG. 5 can be configured as two separate networks operating on different frequencies in the same band (e.g., the 5 GHz band in the case of IEEE standard 802.11n), maximally spaced to minimize interference between the destination node 506 and the source node 505. Other frequency bands and/or communication standards can alternatively be used.

The embodiment of FIG. 5 also provides the ability to implement both TDM and FDM concurrently in a wireless relay node. For example, one frequency, f1, may be used between the source node 505 and the relay node 502, while a different frequency, f2, is used between the relay node 502 and the destination node 506. In such an embodiment, the different frequencies can be time-division multiplexed, e.g., by using a first timeslot of each particular TDM time period to communicate between the source node 505 and the relay node 502 on frequency f1, and using a second timeslot of each particular TDM time period to communicate between the relay node 502 and the destination node 506 on frequency f2. This is in contrast with prior art wireless mesh networks in which the same frequency is used for source-to-relay communication as used for relay-to-destination communication. This capability to operate concurrently on different frequencies provides greater robustness and/or throughput. For example, the same message could be transmitted on two separate frequencies to provide greater robustness, or different messages could be transmitted over different frequencies to provide greater throughput.

The frequencies can be selected dynamically during operation of the network, at random, or based on, for example, a real-time measurement of one or more parameters on the wireless mesh network, such as interference or the signal power to interference-plus-noise power ratio (SINR) within each band, the end-to-end throughput with optimized antenna use at each node, or some other optimization criterion or criteria. Hence, at least the second frequency, f2, can be selected dynamically by the relay node based on a real-time measurement of one or more parameters on the wireless mesh network.

The multiple transmit and receive antennas at each node (not shown) can be used for transmit beamforming/receiver diversity, spatial multiplexing, or a combination thereof. Antenna use at each node in the network can be optimized for end-to-end throughput or some other optimization criterion or criteria. The direct source-to-destination link is not used in a basic configuration, but could be used for end-to-end feedback from the destination node to the source node, for example, to adjust the frequency channels, change the end-to-end data rate, or for other end-to-end optimization.

Figure 6:
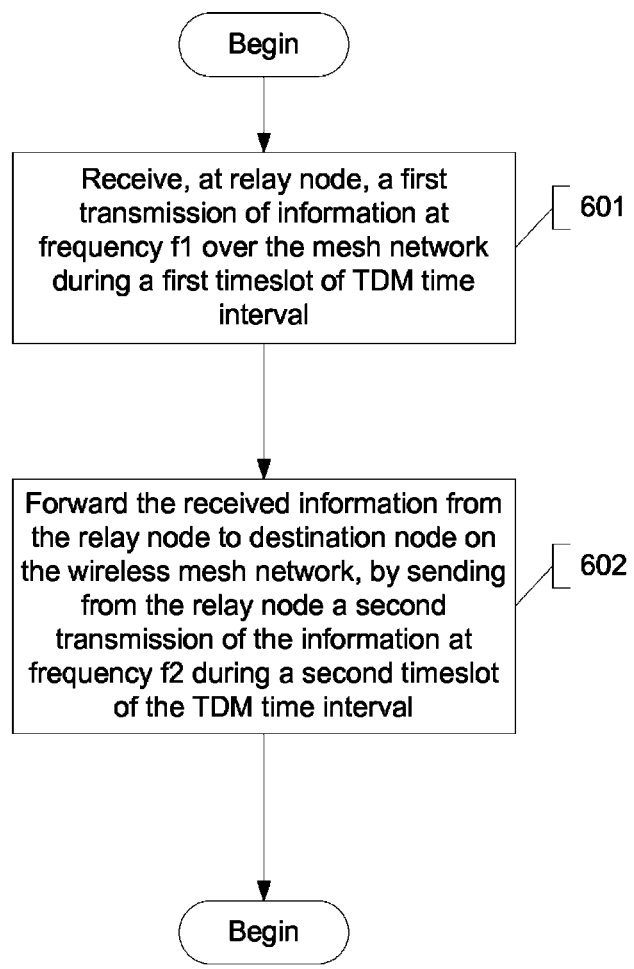
FIG. 6 illustrates an example of a message routing process that may be performed by the relay node in FIG. 5.

FIG. 6 illustrates an example of a message routing process that can be performed by the relay node 502 in FIG. 5. Initially, at step 601 the relay node receives a first transmission of information from the source node at a first frequency, f1, over the mesh network during a first timeslot of a TDM time interval. At step 602, the relay node forwards the received information to the destination node on the wireless mesh network, by sending from the relay node a second transmission of the information at a second frequency, f2, during a second timeslot of the TDM time interval. This process may be repeated if, for example, the message is long enough to require multiple time slots for each hop.

A relay node can also be designed or configured to allow the "reuse" of frequencies within a wireless mesh network. For example, if a particular frequency is being used for transmission by one or more nodes on the network, a relay node can nonetheless decide to use that particular frequency for its own transmissions if it is sufficiently out of range of, or at least out of the directional radiation patterns of, all nodes transmitting on that frequency, such that the likelihood of frequency interference is small. More specifically, the frequency may be reused if it is unlikely that the relay node's transmitting on that frequency would interfere with its own reception or any other node. The decision of whether to reuse a frequency may be based on, for example, whether the maximum signal power level received by the relay node on that particular frequency exceeds a threshold. This capability is illustrated in FIG. 7.

Figure 7:
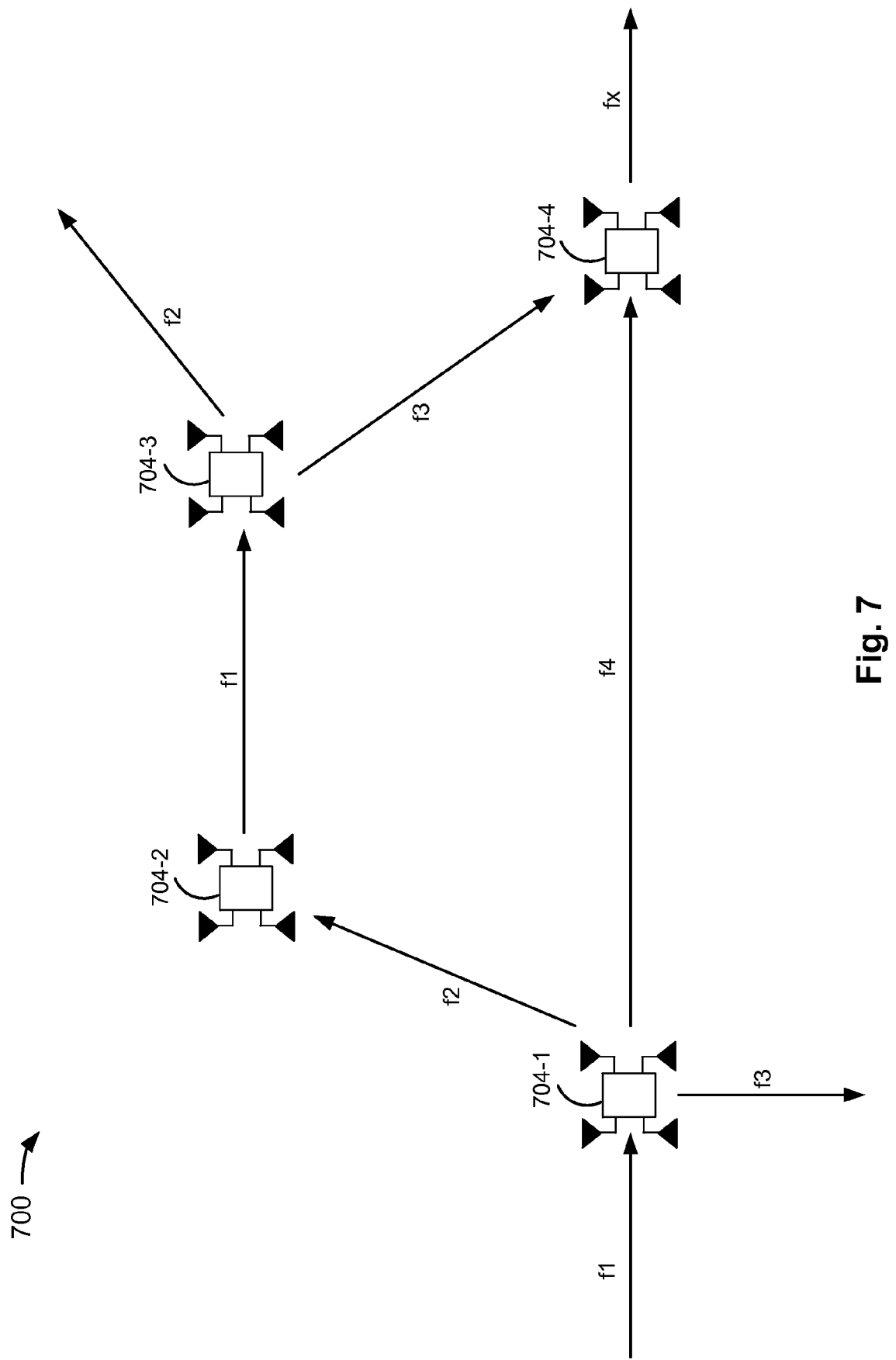
FIG. 7 shows an example of a wireless mesh network in which frequency reuse is implemented.

In FIG. 7, a mesh network 700 includes four relay nodes, 704-1, 704-2, 704-3 and 704-4. Relay node 704-1 receives a signal on frequency f1 and concurrently transmits directional signals on frequencies f2, f3 and f4 in different directions (e.g., by using transmit beamforming). Relay node 704-2 receives the signal on frequency f2 from relay 704-1. Relay node 704-2 determines that it is sufficiently far away from any node using frequency f1 to enable reuse of frequency f1. Consequently, relay node 704-2 transmits to relay node 704-3 on frequency f2. This may include forwarding on frequency f1 whatever message it received from relay node 704-1 on frequency f2.

Similarly, relay node 704-3 receives the signal on frequency f1 from relay node 704-2. Relay node 704-3 determines that it is sufficiently far away from any node using frequency f2 or f3 to enable reuse of those two frequencies. Consequently, relay node 704-3 transmits directional signals concurrently on frequencies f2 and f3, in different directions. Relay node 704-4 receives the signal on frequency f3 from relay node 704-3 and a signal on frequency f4 from relay node 704-1. Relay node 704-4 may choose to transmit to another node on any frequency, fx, that will not interference with its own reception or any other node. For example, relay node 704-4 may determine that it is sufficiently far away from any node using frequency f1 or f2 to enable reuse of either of those frequencies.

Figure 8:
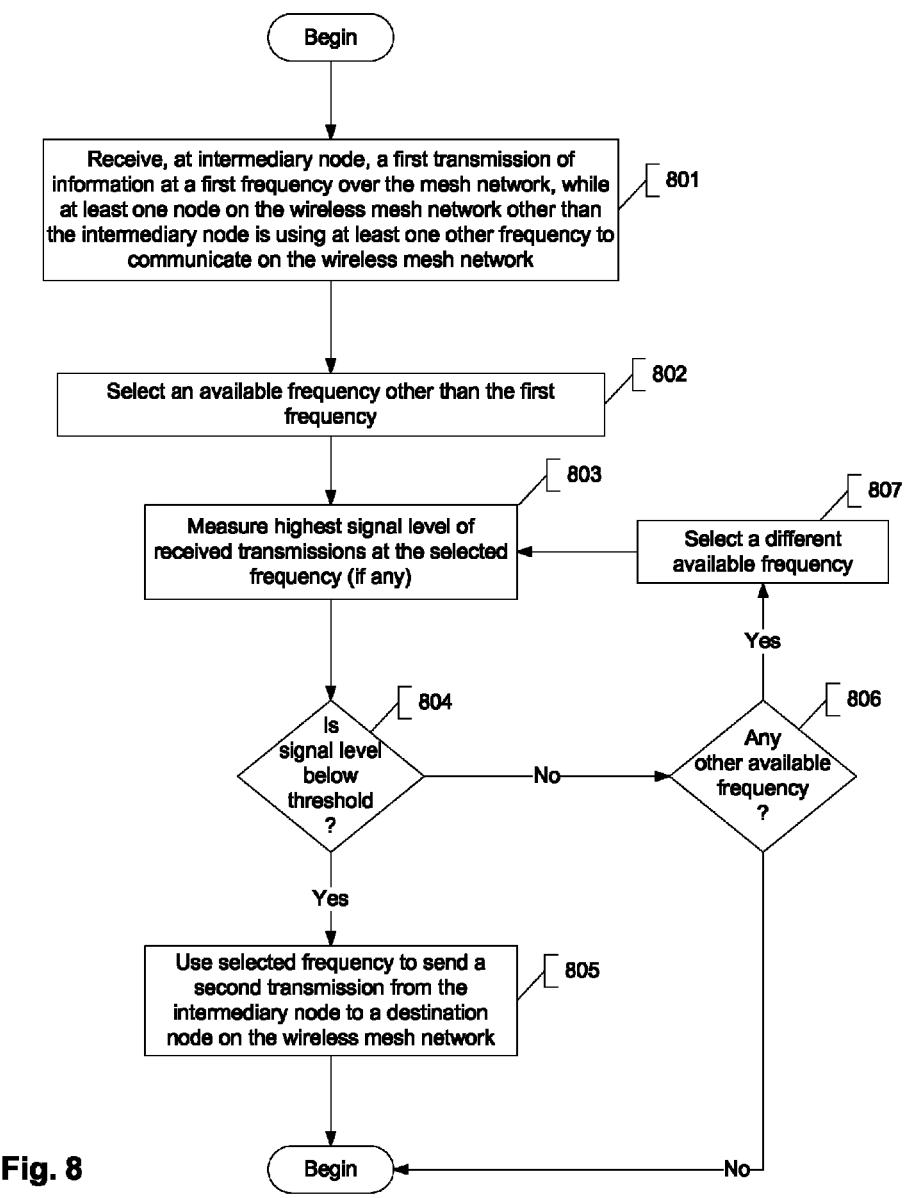
FIG. 8 illustrates an example of a process, which may be performed by a wireless mesh relay node, to reuse frequencies in a wireless mesh network.

FIG. 8 illustrates an example of a process that can be performed by a wireless mesh relay node to reuse frequencies as described above. Initially, at step 801 the relay node receives a first transmission of information at a first frequency over the mesh network, while at least one other node on the wireless mesh network is using at least one other frequency to communicate on the wireless mesh network. At step 802 the relay node selects an available frequency other than the first frequency. The relay node then measures, at step 803, the highest signal level of all received transmissions (if any) at the selected frequency. The relay node then compares that measured highest signal level to a specified threshold level at step 804. The threshold level is chosen so that if the measured signal level falls below that level, it is unlikely that the relay node's transmitting on the same frequency would interfere with its own reception or any other node. Hence, if the measured highest signal level is below the threshold, then at step 805 the relay node uses (reuses) the selected frequency to send a second transmission to a destination node on the wireless mesh network.

If, however, the measured highest signal level equals or exceeds the threshold at step 804, then the process branches from step 804 to step 807. If there is another available frequency to select (e.g., a frequency not currently in use by the relay node) (step 806), then the relay node at step 807 selects a different available frequency (i.e., a frequency other than the frequency or frequencies previously selected in the process), and the process then loops back to step 803 as described above.

In another form of frequency reuse, preprocessing is employed in a relay node on a wireless mesh network employing MU-MIMO, to enable the relay node to transmit to multiple other nodes in the network concurrently at the same frequency without interference. In particular, preprocessing in the relay node can cancel out interference between two or more signals to be transmitted by the relay node on the same frequency. Algorithms for performing this sort of cancellation are known in the art. The advantage to this embodiment is that it does not require the relay node to use separate frequencies when transmitting to separate destination nodes concurrently, which is particularly advantageous when only a limited number of frequencies are available. Consequently, this can be considered to be another type of frequency "reuse".

Figure 9:
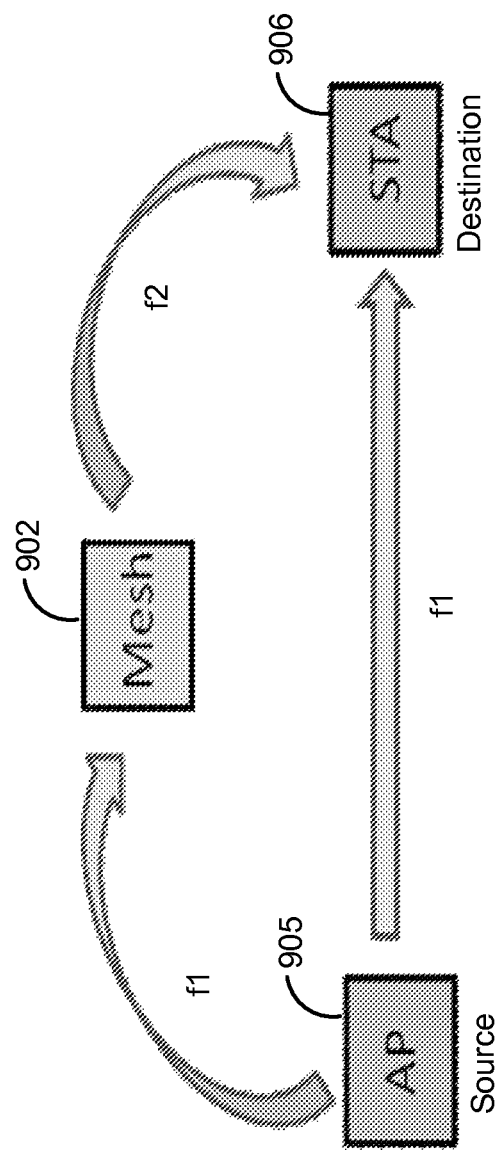
FIG. 9 shows a network configuration for coherently combining transmissions from a source node and a relay node on a wireless mesh network.

According to another embodiment, reliability of wireless mesh communications can be increased by coherently combining a transmission from a wireless mesh relay node with a transmission from a source node. FIG. 9 shows an example of such an embodiment. The relay node 902 can be consistent with the configurations shown in FIGS. 2 and 3. The wireless mesh relay node 902 receives data from the source node 905 on a particular frequency, f1. The source node 905 uses transmit beamforming optimized to send energy in two directions, to the destination node 906 and to the relay node 902. The relay node 902 overhears packet acknowledgements (ACKs) from the destination node 906. If data is not successfully received by the destination node 906 (i.e., the destination node does not send an ACK), the relay node 902 sends a transmission of the same data to the destination node 906 synchronized with the retransmission from the source node 905 so as to coherently combine with it. "Synchronizing" in this context does not require that the timing of the two signals be identical, but only that the timing is within a predetermined acceptable margin of error so that coherent combining as possible at the destination node 906.

The acceptable margin of error in the timing the two signals may depend on how the coherent combining is done in the destination node 906. For example, if the coherent combining is done in the analog domain (e.g., at the antenna inputs), a relatively small margin of error in the timing may be tolerable, e.g., less than a microsecond. On the other hand, if the coherent combining is done after analog-to-digital conversion, considerably more margin of error may be tolerable, perhaps on the order of several microseconds or more. In the latter case, the use of digital delay line circuitry could be used in the receiver to temporally align the two received signals. Various approaches for coherent combining in the receiver are discussed further below.

The synchronization of the transmissions can be accomplished by, for example, a handshake between the source node 905 and relay node 902, or based on internal clocks in the source node 905 and relay node 902, or some other mechanism. For example, if the nodes operate according to a standard, it may be specified in that standard (or as an agreed upon design constraint) that any ACK must be transmitted by a receiving destination node within a specified time period from the original transmission. The relay node 902 can use knowledge of this time period to determine whether an ACK has been sent by the destination node 906 in response to a transmission from the source node 905. It may also be specified or agreed upon that any retransmission of the original message (e.g., due to the lack of an ACK) must occur within another specified time period. The relay node 902 can then use this knowledge to synchronize with the retransmission from the source node 905. Note that the distance between the various nodes in the embodiment of FIG. 9 generally does not matter (within a reasonable limit) for purposes of synchronizing the transmissions, as long as the destination node includes the ability to correct for multi-path and the relative timing of the transmissions is within the specified margin of error.

The source node 905 can also adapt to transmit to the destination node 906 only through the relay node 902 (e.g., place null transmit beam in the direction of the destination node) if the direct path between the source node 905 and the destination node 906 proves not to be useful (i.e., if the destination node cannot receive most or all transmissions from the source node).

In one embodiment, the data is transmitted from the relay node 902 at the same frequency (e.g., f1) as the retransmission from the source node 905. In another embodiment, the data can be transmitted from the relay node 902 at a different frequency, and the two different frequencies are then adjusted (e.g., down-converted) in the destination node 906 to match. The frequency over which the data is sent from the relay node 902 can be selected at random, or based on, for example, a real-time measurement of one or more parameters on the wireless mesh network, such as interference or the SINR within each band, based on end-to-end throughput with optimized antenna use at each node, or based on some other optimization criterion or criteria. Hence, the frequency of the transmission from the relay node 902 can be selected dynamically by the relay node 902, based on a real-time measurement of one or more parameters on the wireless mesh network. The M×N antennas at the relay node 902 and destination node 905 can be used for transmit beamforming/receiver diversity, spatial multiplexing, or a combination. Antenna use at each node in the network can be optimized for end-to-end throughput, meeting some minimum performance targets, or some other optimization criteria.

Note that another embodiment may include two or more relay nodes 902 that operate in the manner described above. Hence, a given destination node 906 may coherently combine signals it receives from two or more relay nodes 902 with each other and/or with a signal from a source node 905.

Figure 10:
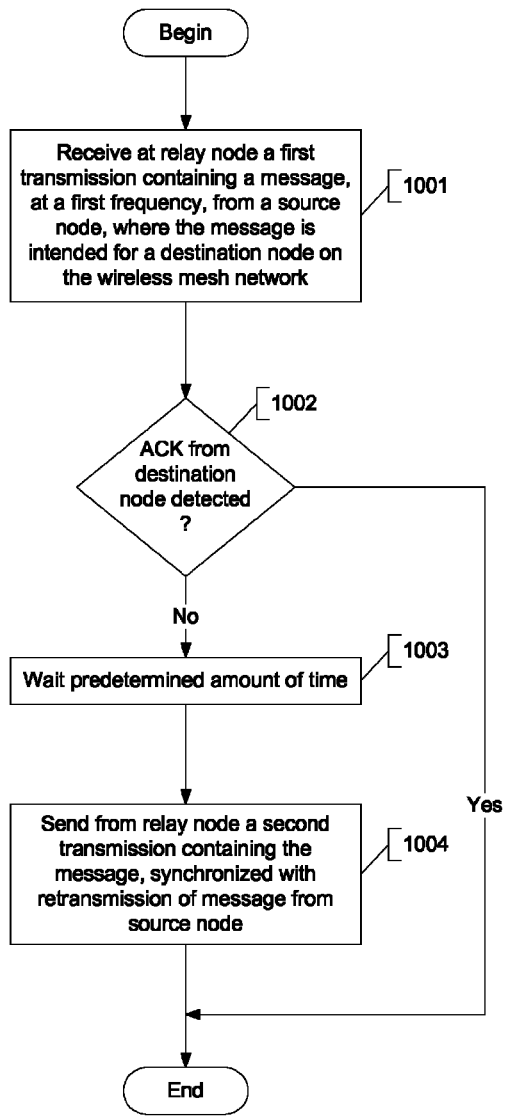
FIG. 10 illustrates an example of a process for coherently combining transmissions from a source node and a relay node on a wireless mesh network.

FIG. 10 shows an example of a process that can be performed by a wireless mesh relay node, such as relay node 902 in FIG. 9, to synchronize a transmission from the relay node with a transmission from a source node, to allow coherent combining. At step 1001 the relay node receives (overhears) a first transmission containing a message (data) from a source node, where the message is intended for a destination node on the wireless mesh network. At step 1002 the relay node determines whether an ACK from the destination node has been detected within a specified time period from the original transmission. If an ACK is detected within the specified time period, the process ends. If an ACK is not detected within the specified time period, then the relay node waits for a predetermined amount of time at step 1003, before sending at step 1004 a second transmission containing the same message (data), such that the second transmission is synchronized with retransmission of message from source node. The predetermined wait time is determined according to the expected relative start time of the retransmission from the source node (e.g., relative to the expiration of the ACK wait period), so that the transmission from the relay node will be synchronized with the retransmission.

Figure 11A:
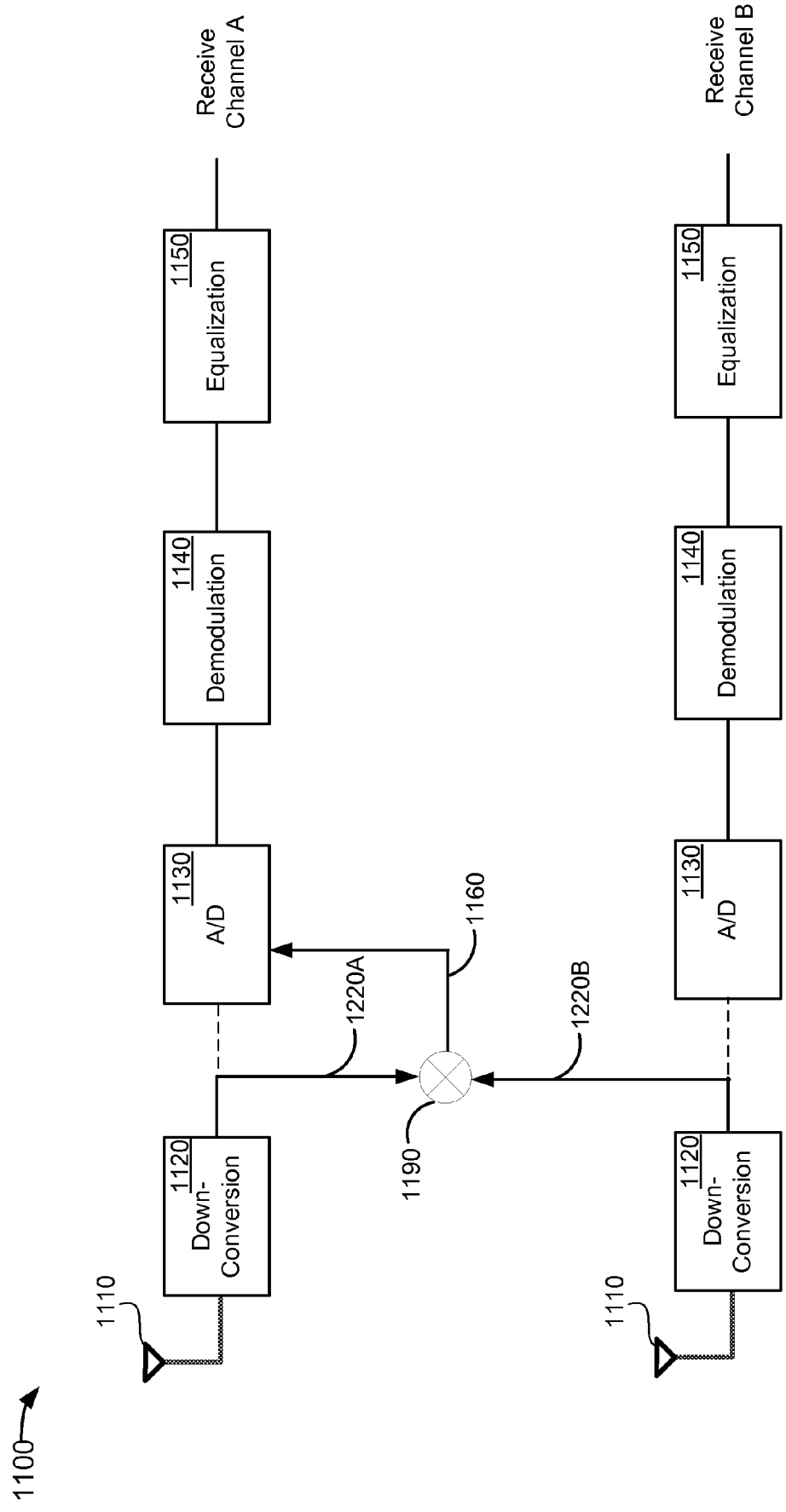
Figure 11B:
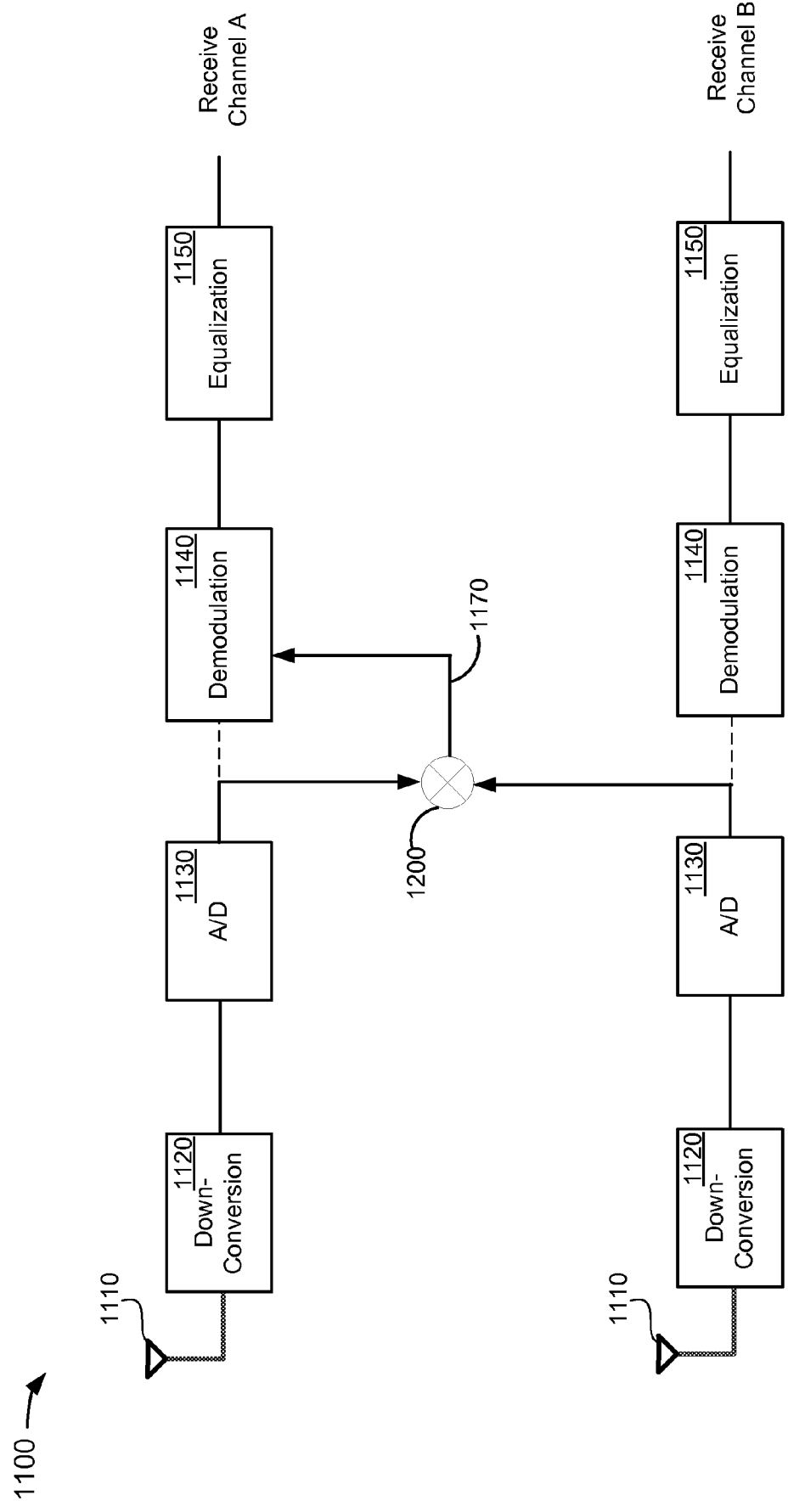

In the destination node, the coherent combining can be done at the antenna input of a receive channel, assuming the two signals are at the same frequency. In other embodiments, the coherent combining can be done at a subsequent processing stage. FIGS. 11A through 11C illustrate examples of such other embodiments. As shown, the RF front-end 1100 in a destination node includes two or more receive channels, e.g., Receive Channel A and Receive Channel B. Each receive channel includes one or more antennas 1110, a down-conversion stage 1120, an analog-to-digital (A/D) conversion stage 1130, a demodulation stage 1140 (e.g., a Fast Fourier Transform (FFT)) and an equalization stage 1150, coupled in series. As shown in FIG. 11A, the coherent combining can be done after down-conversion, for example. The down-conversion stages 1120 convert their raw input signals to respective baseband signals 1220A and 1220B at a common lower frequency, and these baseband signals can be combined by a combiner 1190 to produce combined baseband signal 1160. Consequently, the transmission from the relay node and the retransmission from the source node can be at different frequencies in this embodiment.

In the above two examples, coherent combining is done in the analog domain. However, coherent combining can instead be done in the digital domain. For example, coherent combining can be done by a combiner 1200 after the ND conversion stages 1130 as shown in FIG. 11B, or it can be done by a combiner 1210 after the demodulation stages 1140 as shown in FIG. 11C. In the embodiments of FIGS. 11A through 11C, the appropriate stage of Receive Channel A may receive its input directly from a combiner 1190, 1200 or 1210, rather than from the preceding stage.

Figure 12:
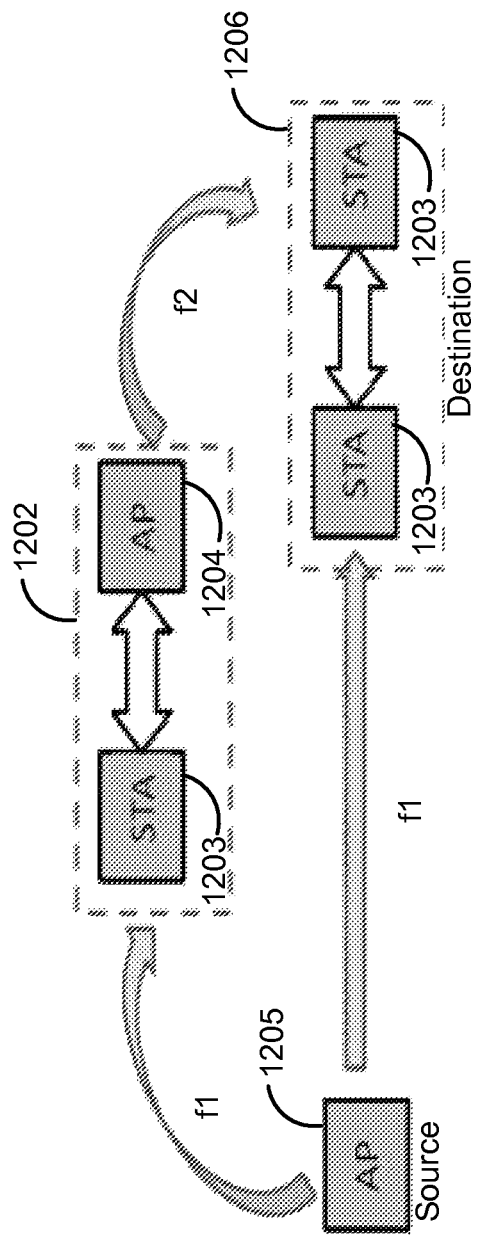
FIG. 12 shows another network configuration for coherently combining transmissions from a source node and a relay node on a wireless mesh network.

FIG. 12 shows another embodiment of a wireless mesh relay node facilitating coherent combining of signals. The wireless mesh relay node 1202 can be consistent with the configurations shown in FIGS. 2, 3 and 5. In the embodiment of FIG. 12, the wireless mesh relay node includes two M×N MIMO communication units (e.g., chipsets) 1203 and 1204, one 1203 operating in station (STA) mode and the other 1204 operating in Access Point (AP) mode, as described above in relation to FIG. 5. In addition, a destination node 1206 also includes two M×N MIMO communication units (e.g., chipsets) 1203, both operating in station (STA) mode. All of these communication units may operate in accordance with IEEE standard 802.11n, for example, although other standards can be implemented instead or in addition.

In operation, the source node 1205 transmits its data to both the relay node 1202 and the destination node 1206 on the same frequency, $f_1$. The station mode communication unit 1203 in the relay node 1202 receives and decodes the transmission, as does one of the communication units 1203 in the destination node 1206. Transmit beamforming at the source node 1205 can be utilized to divide the energy into both directions. The relay node 1202 relays the data it receives from the source node 1205 on a different frequency, $f_2$, to the destination node 1206. Specifically, the AP mode communication module 1204 in the relay node 1202 communicates with the other one of the communication modules 1203 in the destination node.

At the destination node 1206 the signal received from the relay node 1202 is combined coherently with the signal received directly from the source node 1205. Advantages of this configuration include that there is no half-duplexing loss, and the direct path between the source node 1205 and destination node 1206 can be fully utilized for route diversity. Note that the start of the relay signal from the relay node 1202 to the destination node 1206 must occur within a fairly short time interval from the start of the direct transmission from the source node 1205 to the destination node 1206. However, as long as the destination node 1206 has the ability to correct for multi-path, the internal circuitry within the relay node 1202 should easily be able to process the received direct transmission from the source node 1205 and generate the relay signal in sufficient time to allow coherent combining to be done in the destination node 1206, at least in an IEEE 802.11n compliant system.

The frequencies f1 and f2 over which the data is routed can be selected at random, or based on, for example, interference or SINR within each band, end-to-end throughput with optimized antenna use at each node, or some other optimization criterion or criteria. Hence, the relay node's selection of transmit frequency f2 can be based on a real-time measurement of one or more parameters on the wireless mesh network. The M×N antennas at the relay node 1202 and destination node 1206 can be used for transmit beamforming/receiver diversity, spatial multiplexing, or a combination. Antenna use at each node in the network can be optimized for end-to-end throughput, meeting some minimum performance targets, or some other optimization criterion or criteria.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A wireless mesh node comprising:
    a first multiple-input multiple-output (MIMO) transceiver chipset including circuitry which operates in a station mode to receive a transmission of information at a first frequency from an access point on a wireless mesh network during a first timeslot; and
    a second MIMO transceiver chipset including circuitry which operates in an access point mode to forward the received information, from the mesh node at a second frequency to a station on the wireless mesh network during a second timeslot; and
    further having the first and second MIMO transceiver chipsets configured to overhear packet receipt acknowledgements (ACKs) from the station for packets sent directly from the access point to the station, and to synchronize the transmission in the second timeslot of the information received from the access point with a retransmission of the same information from the access point itself, when the station does not acknowledge packet receipt directly from the access point.

2. A method for operating a wireless mesh node; and the method comprising:
    receiving a multiple-input multiple-output (MIMO) transmission of information at a first frequency from an access point on a wireless mesh network during a first timeslot;
    forwarding the received information from the mesh node as a MIMO transmission at a second frequency to a station on the wireless mesh network during a second timeslot;
    overhearing packet receipt acknowledgements (ACKs) from the station for packets sent directly from the access point to the station; and
    synchronizing the transmission in the second timeslot of the information received from the access point with a retransmission of the same information from the access point itself, when the station does not acknowledge packet receipt directly from the access point.

* * * * *